April 18, 1933.                      L. C. IRWIN                     1,903,924
                              AUTOMATIC CONTROL SWITCH
                          Filed March 6, 1930            2 Sheets-Sheet 1
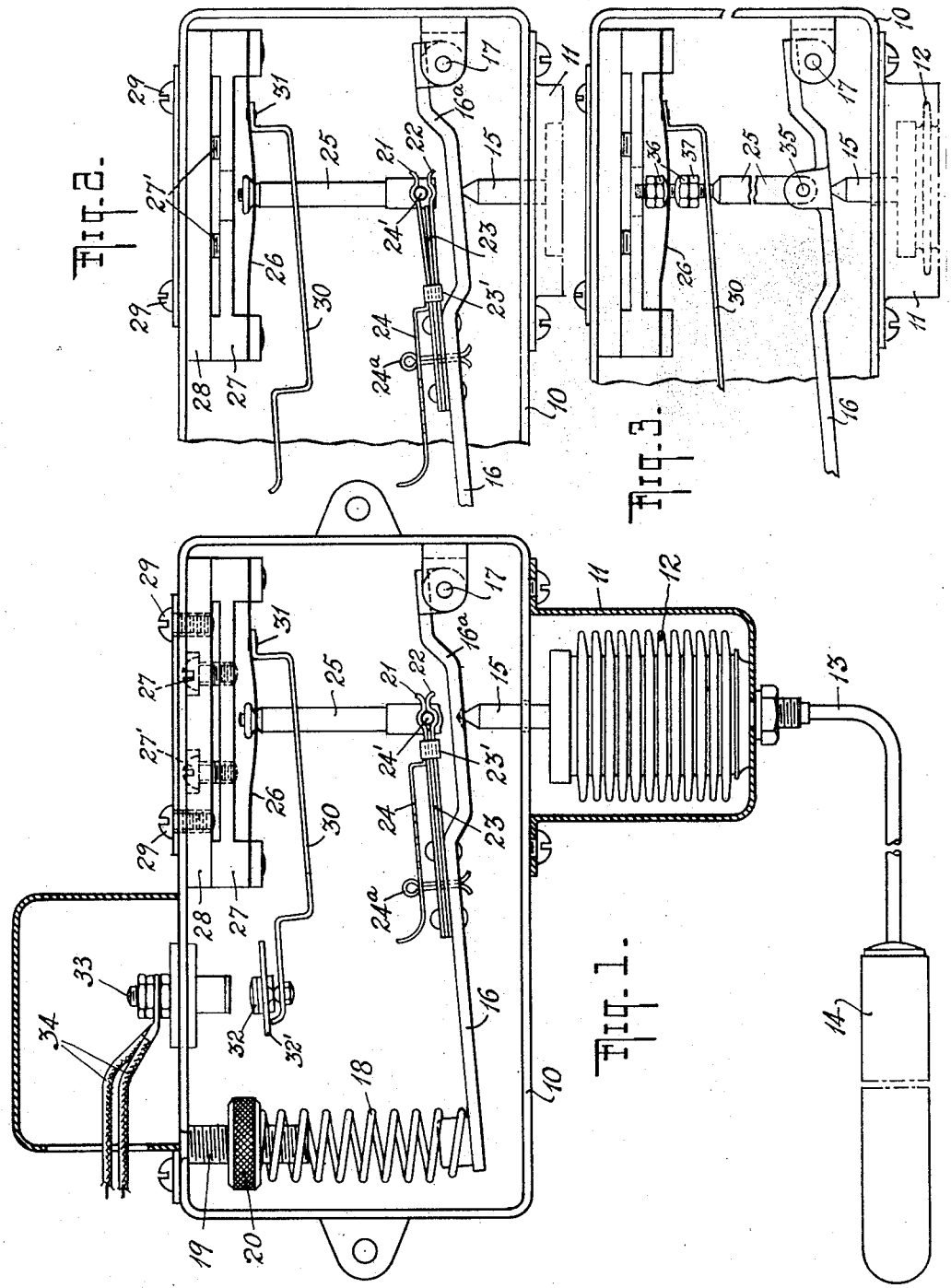
WITNESS                                                    INVENTOR
G. V. Rasmussen                                       LAWRENCE C. IRWIN
                                    BY
                                                            ATTORNEYS April 18, 1933.　　　　L. C. IRWIN　　　　1,903,924
AUTOMATIC CONTROL SWITCH
Filed March 6, 1930　　　2 Sheets-Sheet 2
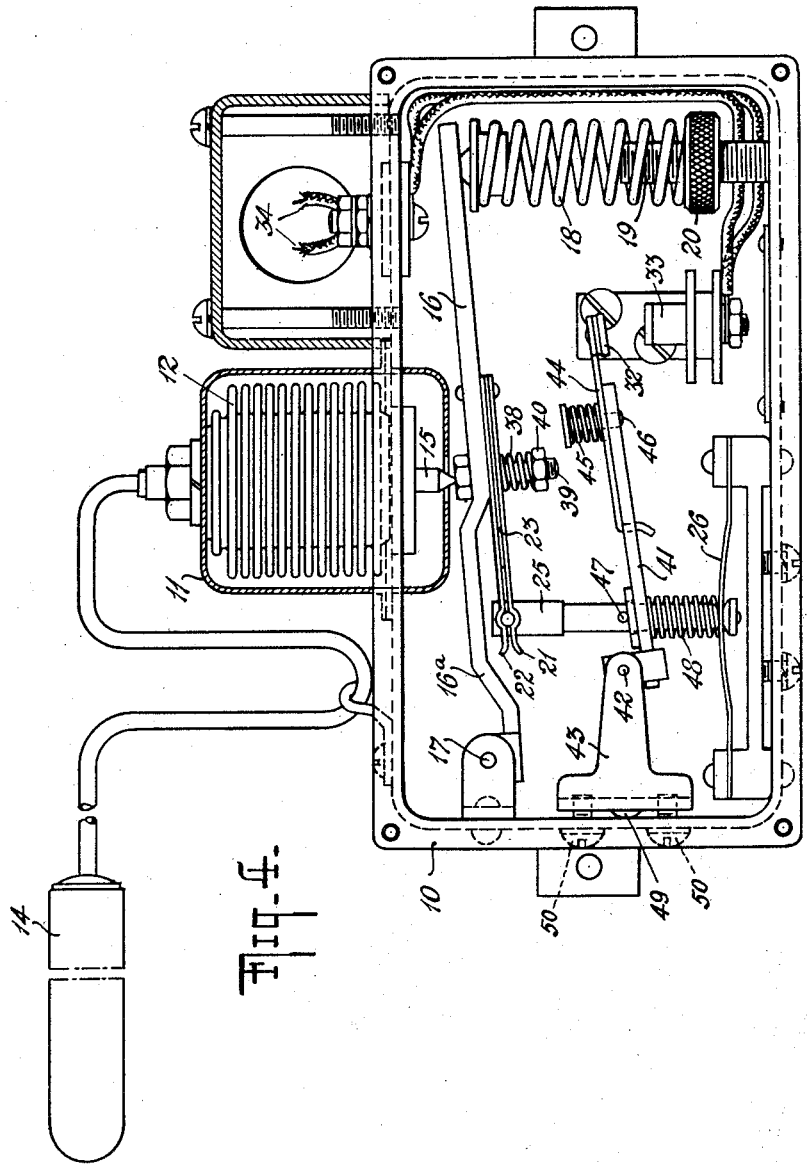
WITNESS
INVENTOR
LAWRENCE C. IRWIN
BY
ATTORNEYS Patented Apr. 18, 1933

1,903,924

UNITED STATES PATENT OFFICE

LAWRENCE C. IRWIN, OF BROOKLYN, NEW YORK, ASSIGNOR TO CHARLES J. TAGLIABUE MFG. CO., OF BROOKLYN, NEW YORK, A CORPORATION OF NEW YORK

AUTOMATIC CONTROL SWITCH

Application filed March 6, 1930. Serial No. 433,576.

My invention relates to automatic control switches of the type employed to control the heating or operation, preferably by electricity, of an apparatus, the switch operating automatically to resume or discontinue the heating or operation of such apparatus in response to changes in the temperature or pressure in the latter in order to maintain predetermined operating conditions in such apparatus.

It is an object of the present invention to provide an automatic switch of the type indicated which is very rapid in its action so as to avoid arcing at the contacts, thereby insuring proper contact for an indefinite period.

It is a further object of the invention to provide an automatic switch composed of relatively few moving parts which are so related that they are subjected to a minimum of wear.

It is also an object of the invention to provide an automatic switch which may be adjusted to predetermine the conditions under which it will make and break the electric contacts; more specifically it is aimed to provide a switch of the snap plate or equivalent overthrow member type whose upper and lower snapping temperatures or pressures may be adjusted either concurrently or independently of each other, so that both the upper and lower control temperature or pressure limits may be varied, the differential remaining the same, or only one limit may be varied, the differential being thus raised or lowered.

In the accompanying drawings are shown by way of example several embodiments of my invention; in said drawings, Fig. 1 shows an elevational view, partly in section, of a form of my improved switch; Fig. 2 is a partial view showing certain of the elements in different position from that shown in Fig. 1; and Figs. 3 and 4 are views showing modifications of the invention.

The switch mechanism is housed within a casing 10 to which is attached an auxiliary casing 11 containing a thermostatic element in the form of a metallic bellows 12 which is connected by means of a tube 13 to a thermostatic bulb 14; the latter contains an expansible fluid, and in the normal operation of the device is positioned at a suitable point in the apparatus whose temperature is to be controlled, i. e. maintained within predetermined limits. It will be understood that where the pressure in an apparatus is to be controlled the bellows 12 may be directly connected to such apparatus, or any other suitable pressure-responsive mechanism may be employed.

Mounted upon the bellows is a stem 15 which projects into the casing 10 and is adapted to engage a lever 16 pivoted at 17 within the casing. The lever 16 is constantly urged into engagement with the stem 15 by means of a spring 18 whose upper end is coiled about a stud 19 fixed to the casing, the spring abutting against an adjustable nut 20 on the stud. The lever 16 is bent downwardly intermediate its length as shown at 16a. A pair of leaf springs 21 and 22 and a flat plate spring 23 positioned between the latter are riveted at one end to the lever 16, their free ends projecting over the bent portion of the lever 16. The springs are surrounded by a slidable band 23' movable by means of a finger piece 24 longitudinally of the springs as indicated in Fig. 2, the finger piece being held in selected position by means of a cotter pin 24a which passes through suitable holes in the finger piece and in the lever 16. The free ends of the leaf springs 21 and 22 project beyond the end of the flat spring 23 and are provided each with a semicircular bend to receive a pin 24' projecting laterally from a rod 25. The latter at its upper end loosely engages a snapping plate or diaphragm 26 which is clamped or riveted at its opposite ends to the rigid or inflexible legs of an H-bar 27 which abuts a plate 28 attached to the casing 10 by means of screws 29. The cross member of the H-bar 27 is drilled and tapped at one or more points to receive a screw or screws 27' passing loosely through holes in the plate 28, the heads of the screws bearing against the plate 28, the screws 27' upon turning thereof operating to clamp the bar 27 against such plate.

A spring arm 30 is fixed at one end to the snap plate 26, as shown at 31 and extends preferably in a direction opposite to that of the fulcrum of the section of the plate to which it is attached. At its other end the arm 30 carries a cross bar 32 of conducting material suitably insulated from the arm 30 by means of non-conducting plates 32'. The bar 32 is located below a pair of terminals 33 and is of sufficient length to bridge the space between such terminals and connect the same electrically. The bar may have a slight pivotal movement in the vertical plane of the two terminals 33. Electric conductors 34 lead from the terminals 33 to the source of electric current and to the heating or other apparatus controlled by the switch.

In the operation of the device, upon increase of pressure in the bellows 12 due to volatilization or expansion of the fluid in the tube 14, or to increase in pressure in the apparatus to which such bellows are connected, the bellows expand vertically and raise the stem 15, thereby raising the lever 16 about its pivot 17. As the lever 16 rises, the springs 21, 22 and 23 yield and become flexed, thus absorbing part of the movement of the bellows, the rod 25 consequently moving vertically at a slower rate than the bar 16. When, however, the snap plate 26, which is moved slowly upwardly by the rod 25, reaches its snapping position, the springs 21, 22 and 23, because of the energy stored therein, project the rod 25 upwardly at very high speed, the plate 26 thus passing its neutral or "dead" position and snapping into its reverse position with very great rapidity. The arm 30 moves with the plate 26, and because of the large leverage ratio, the free end of the arm 30 moves at very high speed and bridges or closes the contacts 33 with such speed that arcing is practically eliminated.

During the upward movement of the lever 16 the spring 18 has been compressed. When the pressure in the bellows 12 decreases and the latter contracts, the stem 15 descends and is followed by the lever 16. The rod 25 does not, however, partake of all of this descending movement, such movement being partially absorbed by the flexure upwardly of the spring 21 and, to a varying degree depending upon the position of the band 23', of the springs 22 and 23. When, however, the snap plate 26 approaches its snapping position the springs pull the rod 25 rapidly downward, the plate being thus carried beyond its dead center and snaps into its lower position shown in the drawings. The cross bar 32 of the arm 30 is thus quickly separated from the terminals 33.

The pressure in the bellows 12 at which the switch is closed may be adjusted by means of the spring 18 and adjusting nut 20. By moving the nut downwardly and thereby compressing the spring 18, the temperature or pressure in the apparatus being controlled at which the switch is made to close is increased; simultaneously the temperature or pressure at which the switch is opened is correspondingly increased. By adjusting the nut 20, the upper and lower limits are changed by approximately equal amounts so that the differential remains substantially the same. By adjusting the band 23' to various positions along the springs 21, 22 and 23 whereby the combined spring is made either weaker or stronger the differential, i. e. the difference between the control temperatures or pressures at which the switch is opened and closed, can be varied; in the position of the parts shown in Fig. 1 such differential is at its minimum, while in the position of the parts shown in Fig. 2 the same is at its maximum. If desired either one of the springs 21 or 22 can be made stronger than the other, or the plate spring 23 can be positioned against the outer side of either of the springs 21 and 22, in which case the differential is changed by varying only the upper or the lower limit.

In order to vary the amount or the amplitude of the snapping movement of the snap plate 26, the screws 27' can be adjusted to bend the cross member of the H-bar upwardly, the legs of the bar being thus turned inwardly and the plate 26 flexed to a greater or less extent.

It was stated above that when the band 23' is positioned as shown in Fig. 2 the differential between the upper and lower temperature or pressure limits at which the plate 26 will snap will be greatest, while in the Fig. 1 position such differential will be smallest. This is obviously due to the fact that the springs are stiffer when the band is at the right and consequently absorb less of the movement of the stem 15 by flexing and transmit such movement more completely to the plate; whereas the springs shown in Fig. 2 absorb a larger part of the movement of the stem 15, since they will flex for a greater distance before their tension is sufficient to overcome the resistance of the plate 26. The flexure of the springs 21 and 22 thus in effect produces a lost motion whose extent is determined by the position of the band 23'.

Such lost motion between the stem 15 or bellows 12 and the plate to vary the differential between the bellows pressures at which the plate 26 snaps in opposite directions may also be produced by the mechanism shown in Fig. 3. In this embodiment of the invention, the springs 21 and 22 are dispensed with and the rod 25 is pivoted upon the lever 16 as shown at 35. The upper end of the rod is screw-threaded and passes through an opening in the snapping plate 26. An adjustable nut 36 is mounted upon the threaded portion of the rod 25 at each side of the plate and is held in adjusted position by a lock nut 37. As indicated in Fig. 3, the nuts 36 may be so positioned upon the rod that in either the lower or upper position of the plate, or in both such positions, there is provided a lost motion connection between the rod 25, and hence the bellows 12, and the snap plates, such connection enabling the rod 25 to exert both a pull and a push upon plate 26, the application of at least one of these forces upon the plate being delayed with respect to the movement of the bellows. This lost motion must be taken up before the snap plate is actuated. It will be evident that the adjustable distance between the nuts 36 will determine the differential between the upper and lower control temperature or pressure limits.

In the form of the invention shown in Fig. 4, wherein the parts are in inverted position with respect to Fig. 1, and wherein similar parts are similarly labelled, the lever 16 and springs 21 and 22 are of substantially the same form as the corresponding elements shown in Fig. 1. The stiffness of the springs 21 and 22 is controlled, however, not by a sliding band 23' but by a spring 38 coiled about the stem of a screw 39 passing through the lever 16 and the springs 21 and 22. The tension of the spring 38 may be regulated by means of an adjustable nut 40.

The switch arm shown in Fig. 4 comprises an arm 41 of insulating material pivoted at 42 upon a bracket 43 fixed to the casing 10. The conducting bridge or contact piece 32 is mounted upon an arm 44 which is bent at the opposite end and passes loosely through an aperture in the arm 41 in such manner as to be capable of pivotal movement about such bent end. The arm 44 is resiliently urged toward the more or less rigid arm 41 by means of a spring 45 coiled about a pin 46 fixed upon the arm 41 and passing loosely through the arm 44; the spring 45 bears upon the arm 44 and abuts against an enlarged head on the pin 46.

The arm 41 extends across the path of a pin 47 positioned on the vertical rod 25. A spring 48 located between the arm 41 and the snap plate urges the arm toward the pin 47. It will be noted that the parts are so positioned that the pin 47 is arranged close to the fulcrum of the arm 41; as a result a small movement of the pin 47 is accompanied by a rather large movement of the outer end of the arm 44.

To adjust the position of the movable contact 32 with respect to the stationary contact 33, the bracket 43 may be tilted about a pivot 49 by adjusting the clamping screws 50. For most reliable operation of the device it is desirable that the plate 26 be firmly clamped at its opposite ends to the support 27 to prevent movement of such ends in any direction during the snapping movements of the plate; and also that the coefficient of expansion of the plate and its support be the same.

The operation of the device shown in Fig. 4 is similar to that of Fig. 2. As the bellows 12 expand upon increase of the temperature or pressure at the point where conditions are to be controlled they move the stem 15 downward and with it the lever 16 against the tension of spring 18. The initial movement is largely absorbed by flexure of the spring 22 and when the tension in such spring is sufficient to overcome the resistance of the plate 26, the latter rapidly snaps to reverse position aided by the tension in the spring. The spring 22 thus in effect produces a lost motion between the bellows 12 and the plate 26. As the plate snaps into reverse position it carries with it the rod 25 which, by means of the pin 47, causes the arm 41 and the parts carried thereby to swing downward with great speed so that contact between the bridge 32 and the terminals 33 is made with extreme rapidity and arcing thereby prevented. Any overthrow of the arm 41 will be absorbed by the yielding connection between such bar and arm 44. Upon deflation of the bellows 12, the spring 18 will operate to cause the lever 16 to follow the upward movement of stem 15, the spring 21 being thereby placed under tension and flexed, so that at least part of the initial movement of the lever 16 is lost so far as the plate 26 is concerned. When the tension in spring 21 is sufficient to overcome the resistance of plate 26, the latter snaps to the position shown in Fig. 4 and thereby breaks the electrical circuit across the terminals 33.

Variations may be resorted to within the scope of the appended claims without departing from the spirit of the invention.

I claim:

1. In an automatic control switch for controlling an electric circuit in response to variations in the temperature or pressure at a selected point, in combination, an element adapted to expand in response to an increase in the temperature or pressure at such point and to contract in response to a decrease in such temperature or pressure, a snap plate having a concave section adapted to snap rapidly to a reverse concave position when moved for a distance from a position of rest, a resilient connection between said element and plate arranged to absorb a part of the movement of said element and become tensioned thereby, and a switch arm operated by said plate to make or break quickly an electric circuit as said plate snaps into reverse position aided by the stored-up energy of said resilient connection.

2. A control switch as set forth in claim 1 including means for adjusting the control temperatures or pressures at which said plate is snapped.

3. A control switch as set forth in claim 1 including means for regulating the stiffness of said resilient connection, whereby the differential of the control temperatures or pressures may be adjusted.

4. In an automatic control switch for controlling an electric circuit in response to variations in the temperature or pressure at a selected point, in combination, an element adapted to expand in response to an increase in the temperature or pressure at such point and to contract in response to a decrease in such temperature or pressure, a snap plate having a concave section adapted to snap rapidly to a reverse concave position when moved past the neutral plane, a resilient connection between said thermostatic element and said plate adapted, while simultaneously absorbing a part of the movement of said element, to move the plate toward such neutral plane as said elements expands or contracts, a switch arm operated by said plate to make or break quickly an electric circuit as said plate snaps into reverse position aided by the stored-up energy of said resilient connection, means for adjusting the control temperatures or pressures at which said plate is snapped, and means for regulating the strength of said resilient connection, whereby both the range and the differential of the control temperatures or pressures may be varied.

5. A control switch as set forth in claim 1 including means for adjusting the concavity of said snap plate.

6. In an automatic control switch for controlling an electric circuit in response to variations in the temperature or pressure at a selected point, in combination, an element adapted to expand in response to an increase in the temperature or pressure at such point and to contract in response to a decrease in such temperature or pressure, a snap plate having a concave section adapted to snap rapidly to a reverse concave position when moved past the neutral plane, a plate spring, a connection between one end of said spring and said snap plate, a connection between the other end of said spring and said element whereby a portion of the movement of said element is transmitted through said spring to said snap plate, the remaining portion of such movement being absorbed by said spring, and a switch arm operated by said snap plate to make or break quickly an electric circuit as said plate snaps into reverse position aided by the stored-up energy of said spring.

7. In an automatic control switch for controlling an electric circuit in response to variations in the temperature or pressure at a selected point, in combination, an element adapted to expand in response to an increase in the temperature or pressure at such point and to contract in response to a decrease in such temperature or pressure, a snap plate having a concave section adapted to snap rapidly to a reverse concave position when moved past the neutral plane, a pivoted lever engaging said element to be swung about its pivot as said element expands or contracts, a spring mounted on said lever and connected to said snap plate, whereby a portion of the movement of said element is transmitted through said spring to said snap plate, the remaining portion of such movement being absorbed by said spring, and a switch arm operated by said plate to make or break quickly an electric circuit as said plate snaps into reverse position aided by the stored-up energy of said spring.

8. In an automatic control switch for controlling an electric circuit in response to variations in the temperature or pressure at a selected point, in combination, an element adapted to expand in response to an increase in the temperature or pressure at such point and to contract in response to a decrease in such temperature or pressure, a snap plate having a concave section adapted to snap rapidly to a reverse concave position when moved past the neutral plane, a pivoted lever engaging said element to be swung about its pivot as said element expands or contracts, a spring mounted on said lever and connected to said snap plate whereby a portion of the movement of said element is transmitted through said spring to said snap plate, the remaining portion of such movement being absorbed by said spring, a switch arm operated by said plate to make or break quickly an electric circuit as said plate snaps into reverse position aided by the stored-up energy of said spring, a second spring engaging said lever and operating to resist the movement of said element, and means for adjusting the pressure of said last-mentioned spring whereby the range of the control temperatures or pressures may be regulated.

9. In an automatic control switch for controlling an electric circuit in response to variations in the temperature or pressure at a selected point, in combination, an element adapted to expand in response to an increase in the temperature or pressure at such point and to contract in response to a decrease in such temperature or pressure, a snap plate having a concave section adapted to snap rapidly to a reverse concave position when moved toward the neutral plane, a pair of leaf springs connected at one end to said element to be moved thereby upon expansion and contraction thereof, a member connected to said snap plate and engaging between the free ends of said leaf springs and alternately urged by the latter as said element expands and contracts to transmit a portion of the movement of the said element to said snap plate, the remaining portion of such movement being absorbed by said springs, and a switch arm operated by said plate to make or break quickly an electric circuit as said plate snaps into reverse position aided by the stored-up energy of one or the other of said springs.

10. The combination as set forth in claim 9, including means for varying the stiffness of said leaf springs.

11. The combination as set forth in claim 9, including a band surrounding said springs, said band being adjustable to vary the stiffness of such springs.

12. The combination as set forth in claim 9, wherein one of said leaf springs is stronger than the other.

13. The combination as set forth in claim 9, wherein one of said leaf springs is stronger than the other, and means for varying the stiffness of said springs.

14. In an automatic control switch for controlling an electric circuit in response to variations in the temperature or pressure at a selected point, in combination, an element adapted to expand in response to an increase in the temperature or pressure at such point and to contract in response to a decrease in such temperature or pressure, a snap plate having a concave section adapted to snap rapidly to a reverse concave position when moved toward the neutral plane, a pivoted lever engaging said element to be swung about its pivot as said element expands or contracts, a pair of leaf springs fixed at one end to said lever, a member connected to said snap plate and engaging between the free ends of said leaf springs and alternately urged by the latter as said element expands and contracts to transmit a portion of the movement of said element to said snap plate, the remaining portion of such movement being absorbed by said springs, a switch arm operated by said plate to make or break quickly an electric circuit as said plate snaps into reverse position aided by the stored-up energy of one or the other of said springs, means for varying the stiffness of said springs to vary the differential of the control temperatures or pressures, a spring engaging said lever and operating to resist the movement of said element, and means for adjusting the pressure of said last-mentioned spring to vary the range of said control temperatures or pressures.

15. In an automatic control switch for controlling an electric circuit in response to variations in the temperature or pressure at a selected point, in combination, an element adapted to expand in response to an increase in the temperature or pressure at such point and to contract in response to a decrease in such temperature or pressure, a snap plate having a concave section adapted to snap rapidly to a reverse concave position when moved toward the neutral plane, a support for said snap plate, means for holding the ends of said snap plate against movement on said support, a switch arm operated by said plate to make or break quickly an electric circuit as said plate snaps into reverse position, and a lost motion connection between said element and said snap plate operative to transmit delayed movement from the former to the latter, said connection constructed to exert a force on said snap plate in both directions effective to move the plate toward the neutral plane as the snapping temperatures or pressures are approached.

16. The combination as set forth in claim 15 wherein said lost motion connection is adjustable to vary the differential between the control temperatures or pressures.

17. In an automatic control switch for controlling an electric circuit in response to variations in the temperature or pressure at a selected point, in combination, an element adapted to expand in response to an increase in the temperature or pressure at such point and to contract in response to a decrease in such temperature or pressure, a snap plate having a concave section adapted to snap rapidly to a reverse concave position when moved toward the neutral plane, a support for said snap plate, means for holding the ends of said snap plate against movement on said support, a pivoted lever engaging said element to be swung about its pivot as said element expands or contracts, a spring urging said lever toward said element, a switch arm operated by said plate to make or break quickly in electric circuit as said plate snaps into reverse position, and a lost motion connection between said lever and said snap plate operative to transmit delayed movement from the former to the latter.

18. In an automatic control switch for controlling an electric circuit in response to variations in the temperature or pressure at a selected point, in combination, an element adapted to expand in response to an increase in the temperature or pressure at such point and to contract in response to a decrease in such temperature or pressure, a snap plate having a concave section adapted to snap rapidly to a reverse concave position when moved toward the neutral plane, a support for said snap plate, means for holding the ends of said snap plate against movement on said support, a pivoted lever engaging said element to be swung about its pivot as said element expands or contracts, a spring urging said lever toward said element, a switch arm operated by said plate to make or break quickly an electric circuit as said plate snaps into reverse position, and a lost motion connection between said lever and said snap plate operative to transmit delayed movement from the former to the latter, said connection being adjustable to vary the differential between the control temperatures or pressures of the snap plate.

19. The combination as set forth in claim 17 wherein said lost motion connection comprises a spring which is adapted to yield during the initial movement of the responsive element.

20. In an automatic control switch for controlling an electric circuit in response to variations in the temperature or pressure at a selected point, in combination, an element adapted to expand in response to an increase in the temperature or pressure at such point and to contract in response to a decrease in such temperature or pressure, a snap plate having a concave section adapted to snap rapidly to a reverse concave position when moved toward such reverse position, a member associated with the central portion of said plate, a movable switch arm suddenly and rapidly actuated by said member on the snapping of the plate in one direction and movable suddenly and rapidly in the opposite direction upon reverse snapping of said plate, means between said plate and arm to effect said latter movement of the arm, a movable element intermediate the first-named element and the said member, means operative to maintain continuous contact between the said elements, and a resilient connection between said second-mentioned element and said member arranged to absorb a part of the movement of said intermediate element in either direction and become tensioned thereby and adapted to aid by its stored-up energy the rapid snapping of the plate.

21. In an automatic control switch for controlling an electric circuit in response to variations in the temperature or pressure at a selected point, in combination, an element adapted to expand in response to an increase in the temperature or pressure at such point and to contract in response to a decrease in such temperature or pressure, a snap plate having a concave section adapted to snap rapidly to a reverse concave position when moved toward such reverse position, a member associated with the central portion of said plate, a movable switch arm suddenly and rapidly actuated by said member on the snapping of the plate in one direction and movable suddenly and rapidly in the opposite direction upon reverse snapping of said plate, means between said plate and arm to effect said latter movement of the arm, means effective upon said plate to urge the same into its original position, and a resilient connection between said member and said responsive element and arranged to absorb a part of the movement of said responsive element and become tensioned thereby, said resilient connection adapted by its stored-up energy to aid the rapid snapping movement of the plate.

22. In an automatic control switch for controlling an electric circuit in response to variations in the temperature or pressure at a selected point, in combination, an element adapted to expand in response to an increase in temperature or pressure at such point and to contact in response to a decrease in such temperature or pressure, an overthrow member adapted to move quickly to a reverse position when moved for a distance from a position of rest, a lost motion connection between said element and member adapted to transmit delayed movement from said element to said member, said connection constructed to exert a force on said overthrow member in both directions effective to move such member toward the neutral plane as the snapping temperatures or pressures are approached, a switch arm operated by said member to make or break quickly an electric circuit as said member moves into the reverse position, a spring arranged to exert pressure upon said element to oppose the expansion thereof, said overthrow member being unaffected by said spring and arranged to move freely in both directions without aid or resistance by said spring, and means for adjusting the pressure of said spring on said element while at the same time keeping substantially unaffected the degree of pressure required to cause overthrow of said member in either direction.

23. The combination as set forth in claim 22 wherein said lost motion connection includes a resilient member adapted to absorb a part of the movement of said element and become tensioned thereby, said resilient member operative to aid by its stored-up energy the rapid movement of the first mentionted member into its reverse position.

LAWRENCE C. IRWIN.